United States Patent
Sampath et al.

(10) Patent No.: US 9,973,378 B2
(45) Date of Patent: May 15, 2018

(54) IMPLEMENTING GATEWAY REDUNDANCY IN A NETWORK

(71) Applicant: HEWLETT-PACKARD DEVELOPMENT COMPANY, L.P., Houston, TX (US)

(72) Inventors: Rangaprasad Sampath, Bangalore Karnataka (IN); Anoop Nair, Bangalore Karnataka (IN); Sudhir Kumar ChimakurthyOm, Bengaluru Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 56 days.

(21) Appl. No.: 13/748,342

(22) Filed: Jan. 23, 2013

(65) Prior Publication Data

US 2014/0204730 A1    Jul. 24, 2014

(51) Int. Cl.
*H04L 12/26* (2006.01)
*H04L 29/12* (2006.01)
*H04L 12/24* (2006.01)

(52) U.S. Cl.
CPC ...... *H04L 41/0668* (2013.01); *H04L 43/0811* (2013.01); *H04L 43/10* (2013.01); *H04L 61/103* (2013.01)

(58) Field of Classification Search
CPC ... H04L 43/0811; H04L 43/10; H04L 61/103; H04L 41/0668
See application file for complete search history.

(56) References Cited

U.S. PATENT DOCUMENTS

| | | | |
|---|---|---|---|
| 7,693,048 | B1 | 4/2010 | O'Riordan |
| 7,814,232 | B2 | 10/2010 | Satapati et al. |
| 2006/0248369 | A1* | 11/2006 | Kumazawa et al. ............. 714/4 |
| 2008/0034112 | A1* | 2/2008 | Imai et al. .................... 709/238 |
| 2010/0040072 | A1* | 2/2010 | Kitada .......................... 370/400 |
| 2012/0044813 | A1 | 2/2012 | Nandagopal et al. |

OTHER PUBLICATIONS

Rothenberg et al., "Revisiting Routing Control Platforms with the Eyes and Muscles of Software-Defined Networking," Telecomm. Research and Development Center (CPqD) Campinas—SP—Brazil, Aug. 13, 2012, <http://conferences.sigcomm.org/sigcomm/2012/paper/hotsdn/p13.pdf>.

Othman et al. "Design and Implementation of Application based Routing Using OpenFlow," Kyushu University, Jun. 16-18, 2010, <http://dl.acm.org/citation.cfm?id=1853079.1853096&coll=DL&dl=GUIDE&CAD=146821963&CFTOKEN=92303556>.

\* cited by examiner

*Primary Examiner* — Jianye Wu
(74) *Attorney, Agent, or Firm* — Fabian VanCott

(57) ABSTRACT

Implementing gateway redundancy in a network includes sending a message to a first device of multiple devices of a network through a controller where the first device is a master gateway and a second device of the multiple devices is a backup gateway, and making a decision as to whether the first device remains as the master gateway.

20 Claims, 6 Drawing Sheets

IMPLEMENTING GATEWAY REDUNDANCY IN A NETWORK

BACKGROUND

Virtual Router Redundancy Protocol (VRRP) is a protocol for providing default gateway redundancy in a network. VRRP provides for a dynamic assignment of a default gateway to a single member of a set of VRRP routers that collectively act as a single virtual router with a common virtual internet protocol (IP) address. A VRRP network is a network that has two or more routers that support the VRRP protocol. Hosts or other network components use the common IP address of the VRRP routers as their default gateway.

In VRRP protocol, the router with a highest priority becomes the master gateway of the group of routers. In the role as a master gateway, a VRRP router has several tasks. One task is owning the VRRP virtual IP address and answering address resolution protocol (ARP) requests sent to the virtual IP address. The master gateway also associates the virtual IP address with the virtual media access control (MAC) address. Another task is sending VRRP advertisement packets at regular intervals to other VRRP routers in the set to let them know that the device is still functioning as the master gateway.

When the VRRP router designated as the master loses connectivity to the network, the VRRP advertisement packets no longer reach the other routers in the set. In such a situation, one of the other routers will take over as the master router in response to the discontinuation of VRRP advertisement packets. The VRRP router will also send out a gratuitous ARP request associating the virtual IP address with the virtual MAC address. This causes downstream switches to forward traffic destined to the virtual MAC address to the new VRRP master router. This task ensures that traffic to the gateway from network components in the network is not interrupted. Once accomplished, the new router will own the virtual IP address, answer ARP requests sent to the virtual IP address, and send out VRRP advertisement packets at regular intervals.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

In VRRP protocol, all of the physical routers providing the virtual VRRP router capability need to use the VRRP protocol. The principles described herein include a default redundancy system that does not use VRRP protocol and as a result can be implemented with simpler routers.

Each of the routers will be in communication with a remote OpenFlow controller that has the power to modify the data plane forwarding behavior of network devices through a well defined forwarding instruction set. An OpenFlow controller is a program, hardware, or combination thereof that is different from the legacy network switches or routers. The OpenFlow controller implements the control plane or logic for the entire network. The OpenFlow controller has an ability to push down rules into the network devices that control the traffic flow throughout the network. Thus, the gateway redundancy system can be implemented with program instructions available to the controller. As a result, changes to the default gateway redundancy system as a network service allow for easy upgrades and enhancements when compared to making enhancements to a protocol like VRRP on network devices. Standardized protocols take time to implement on a network. When changing a protocol, customers have to wait for network device vendors to implement the latest standards on the network devices and even then, the updates may not necessarily solve the issues specific to the customer's application. The principles described herein provide a gateway redundancy system that offers greater flexibility to the customer. It offers faster and easier upgrades to the gateway redundancy service and opportunity for custom changes.

The principles described herein include a method for implementing gateway redundancy in a network. Such a method includes sending a message to a first device of multiple devices of a network through a controller where the first device is a master gateway and a second device of the multiple devices is a backup gateway, and making a decision as to whether the first device remains as the master gateway.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
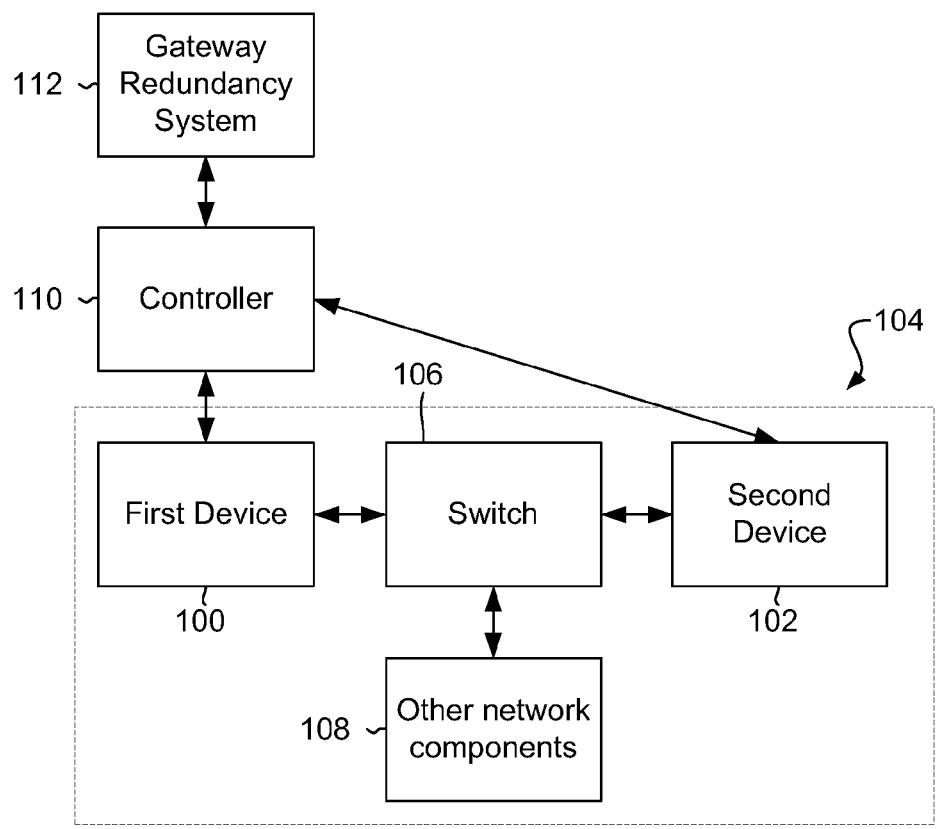
FIG. 1 is a diagram of an example of network components according to the principles described herein.

FIG. 1 is a diagram of an example of network components according to the principles described herein. In this example, the network components include a first device (100) and a second device (102), each of which has the ability to be a gateway for the network (104). The first and second devices (100, 102) are also in communication with a network switch (106). The switch (106) is in communication with other network components (108). Both the first and the second device (100, 102) have the ability to be gateways to the network (104).

A network gateway is the device that connects a network (104) to other networks. Generally, the gateway provides connectivity for hosts within a network, such as network (104), to other networks. If the gateway crashes or fails, the hosts within that network lose connectivity to other networks. In some examples, a router has the ability to be a network gateway. In other examples, a different device is capable of being the gateway.

The first and second devices (100, 102) are also in communication with an OpenFlow controller (110) that is located at a remote location. The OpenFlow controller is a program that implements the control plane or logic for the entire network. The OpenFlow controller (110) has the ability to modify the data plane forwarding behavior of the first and second devices (100, 102) with instructions sets. As such, the OpenFlow controller has the ability to control which of the first and second devices (100, 102) is a master gateway that performs the duties of a gateway and which is a backup gateway that is capable of performing the duties of the gateway, but does not actually perform those duties while the master gateway is performing them.

While the OpenFlow controller (110) has the ability to assign which of the first and second devices (100, 102) is the master gateway and which is the backup gateway, the OpenFlow controller makes this assignment based on the instructions from the gateway redundancy system (112). The gateway redundancy system (112) is the decision maker who determines which of the first and second devices (100, 102) should be the master gateway and the backup gateway.

The gateway redundancy system (112) may determine that the first or the second device (100, 102) should be operating as the master gateway based on whether the first or the second device (100, 102) is currently performing the duties of the master gateway, whether the first or second device (100, 102) is in communication with the OpenFlow controller (110), other factors, or combinations thereof. For example, the network (104) may have a policy that the first device (100) is the default master gateway. In such an example, the first device (100) performs the functions of the master gateway until the first device (100) appears unfit to be the master gateway. The device performing the duties of a master gateway may be unfit to be the master gateway if that device is disconnected from the controller, is disconnected from the switch, has an internal issue, is experiencing failures, has other issues, or combinations thereof.

For purposes of the following example, assume that the first device (100) is a default gateway for the network (104). In this example, the gateway redundancy system (112) causes the OpenFlow controller (110) to send a message to the first gateway, which is then broadcasted to all the components of the network (104). The message is an address resolution protocol (ARP) request, a neighbor discovery (ND) request, or combinations thereof. The gateway redundancy system (112) expects to receive a response from the message. If the response is received, the gateway redundancy system (112) assumes that the first device is functioning adequately to be the master gateway. The response can be generated by the first device (100) or any other component on the network (104). The received response may come through the first device (100) or any other device on the network. The gateway redundancy system (112) is concerned about whether the message is properly forwarded through the master gateway, not whether the response is routed back through the master gateway. The gateway redundancy system is just concerned that it gets a response within a predetermined timeout period, not which component of the network that the response comes from.

But, if the predetermined timeout period lapses between the time that the message was sent before a response is received, the gateway redundancy system (112) may determine that the first device (100) is no longer operating or is at least no longer performing at least some of its duties of the master gateway. In such an example, the gateway redundancy system (112) can send the message to the second device (102) with the expectation of receiving a response from either the second device (102) or another network component behind the second device (102). If such a response is received, the gateway redundancy system (112) will assign the second device to be the gateway device and assign the first device (100) to be the backup gateway. If the gateway redundancy system (112) fails to receive a response within the predetermined timeout period after sending the message to the second device (102), the gateway redundancy system (112) may send the message through yet another device designated as a backup gateway.

While the example of FIG. 1 has been described with reference to a network (104) with just a first and second device (100, 102) capable of being gateways, any appropriate number of devices capable of being gateways may be used in accordance with the principles described herein. For example, multiple devices in the network (104) can be designated as backup gateways. Further, the gateway redundancy system can be implemented to service multiple networks simultaneously.

Figure 2:
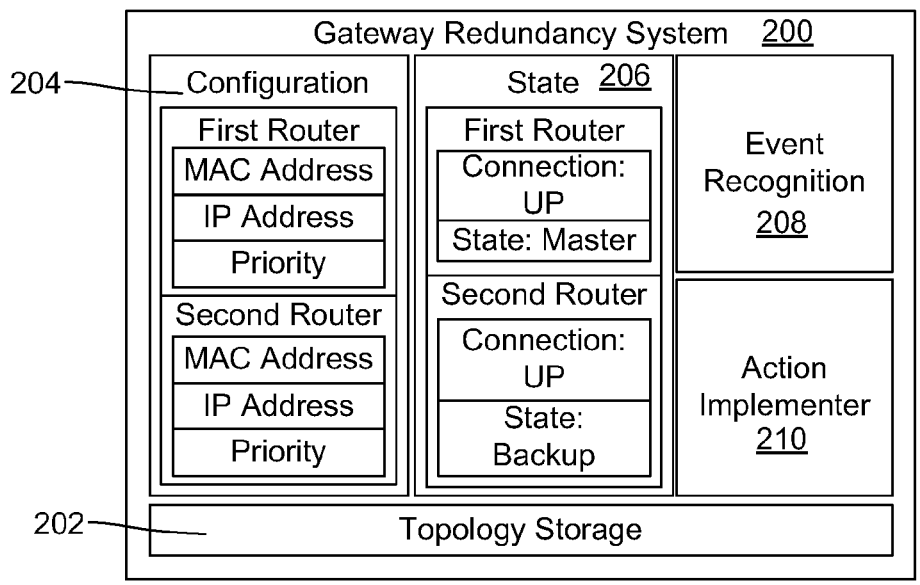
FIG. 2 is a diagram of an example of a gateway redundancy system according to the principles described herein.

FIG. 2 is a diagram of an example of a gateway redundancy system (200) according to the principles described herein. In this application, the gateway redundancy system (200) has a number of components that are embodied as program instructions, hardware, or both to allow the gateway redundancy system (200) to implement gateway redundancy in the network.

The gateway redundancy system (200) has a topology component (202) that stores and/or tracks the existence of the network components, the logical connections between network components, or combinations thereof. The topology component (202) can be just a file that describes the topology in some meaningful way. In other examples, the topology component (202) is a module that is incorporated in the controller. Examples of controllers that come bundled with functionality to store the network's topology component include Beacon®, which is a cross-platform, modular, Java-based OpenFlow controller that is licensed by Stanford University located at Stanford, Calif., U.S.A. Another suitable OpenFlow controller is Floodlight®, which is licensed through the Apache Software Foundation, which is located in Forest Hill, Md., USA.

A configuration component (204) of the gateway redundancy system (200) houses characteristics for the devices capable of being the gateway. Such characteristics include the device's media access control (MAC) address, internet protocol (IP) address, priority for being the master gateway, configurations specified by the user for such devices, or combinations thereof.

A state component (206) of the gateway redundancy system (200) contains a state of the network or, as in the example of FIG. 2, the state of the network devices of interest. For example, the connection field indicates the state of the connection between the gateway redundancy system (200) and the device. The state fields indicate the current role of a network device being managed by the gateway redundancy system (200). The state field can change based on information in the configuration component (204) or the occurrence of specific events.

An events component (208) of the gateway redundancy system (200) handles events that are relayed to the gateway redundancy system (200) by the OpenFlow controller and/or the topology component (202). For example, a packet_in event indicates that a new packet was received on the physical device in the network and the network device forwarded that packet to the controller. A packet_in message is terminology used in the standard OpenFlow Specification version 1.3. A failure detected event indicates that a network device has failed in the network.

An action component (210) of the gateway redundancy system (200) has actions that are taken based on information contained in the state component (206) of a network device as managed by the gateway redundancy system (200). For example, a network device classified in the state component (206) as the master gateway will actively send out responses and keepalives sent to it by the OpenFlow controller to indicate that the master gateway is still alive and functioning properly enough to remain as the master gateway. In addition, the device classified as the master gateway will send out gratuitous ARP messages when it takes over the role as the master gateway. A network device classified as a backup gateway state does not perform these actions.

Figure 3:
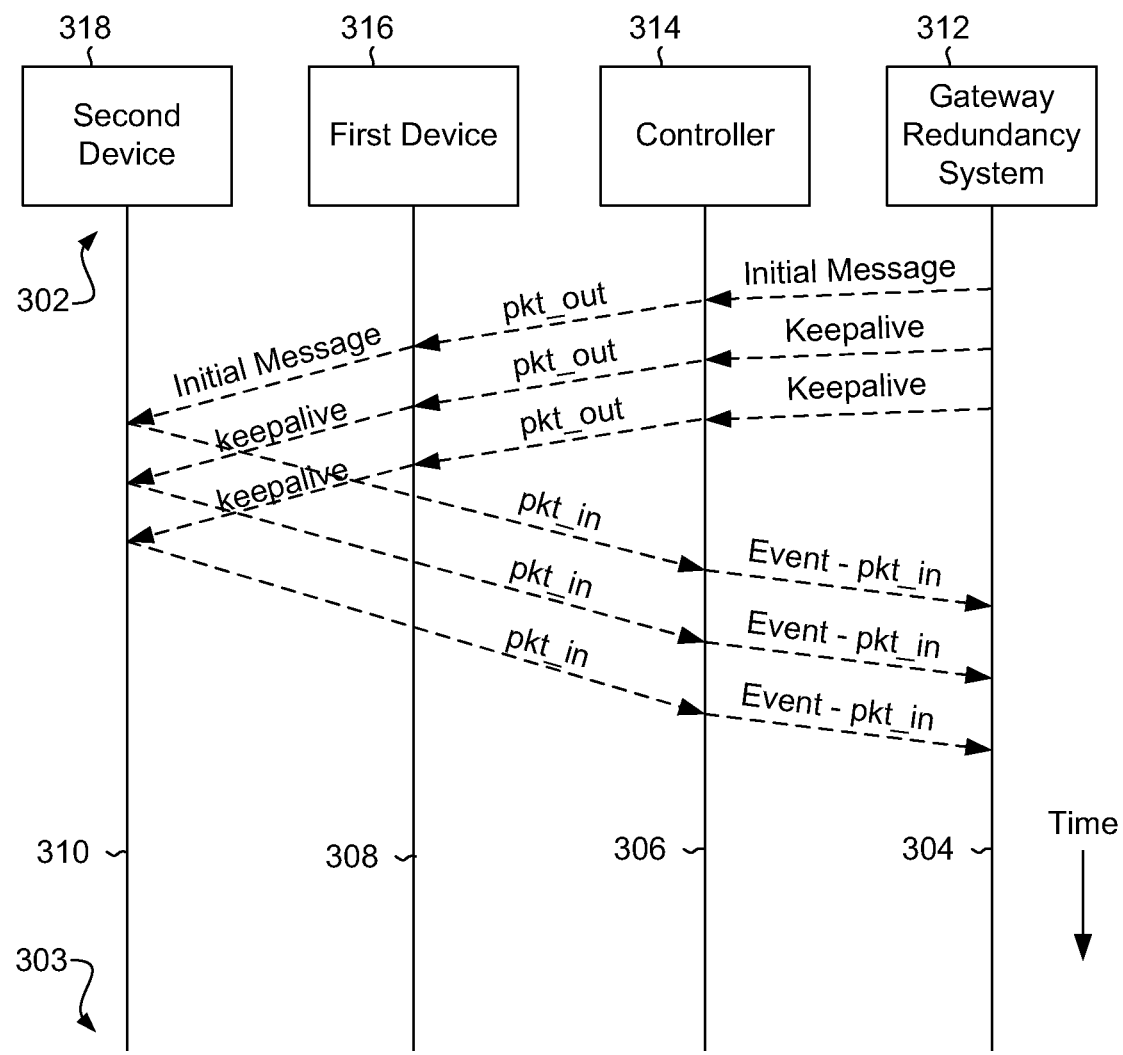
FIG. 3 is a diagram of an example of keeping a device as a master gateway according to the principles described herein.

FIG. 3 is a diagram of an example of keeping a device as a master gateway according to the principles described herein. In this example, time is schematically depicted as passing from the top (302) of lines (304, 306, 308, 310) to the bottom (303) of the lines (304, 306, 308, 310). Each line (304, 306, 308, 310) is associated with a component involved with keeping a device as the master gateway. For example, line (304) schematically represents events that occur at the gateway redundancy system (312), line (306) schematically represents events that occur at the OpenFlow controller (314), line (308) schematically represents events that occur at the first device (316), and line (310) schematically represents events that occur at the second device (318).

The first device (316) assumes the role of master gateway due to a policy default rule or selection by the gateway redundancy system (312). The role of the master gateway implies that the first device (316) will handle the default gateway functionality on the network. Further, the first device's status as the master gateway causes the gateway redundancy system (312) to take certain actions to assert that the first device (316) assumes the role of as the master gateway. The gateway redundancy system (312) sends out a gratuitous ARP request associating the virtual IP address with the MAC address of the first device (316) to inform at least one of the network components that the first device (316) is the master gateway. Then, the gateway redundancy system (312) will start sending periodic keepalive messages to keep the logical connection between the gateway redundancy system (312) and the network components alive. Each of the packets sent from the gateway redundancy system (312) are encapsulated into OpenFlow packet_out messages that are sent from the OpenFlow controller (314). The first device will (316) unwrap the OpenFlow packet_out message containing the encapsulated packet and put the formerly encapsulated packet onto the network.

The OpenFlow controller (314) will also respond to all requests for the virtual IP address when they come in as packet_in events. In the example of FIG. 3, the second device (318), which is classified as the backup gateway will forward packet-in messages to the OpenFlow controller (314) and the gateway redundancy system (312). However, as the backup gateway, the second device (318) does not generate any responses or keepalives.

Figure 4:
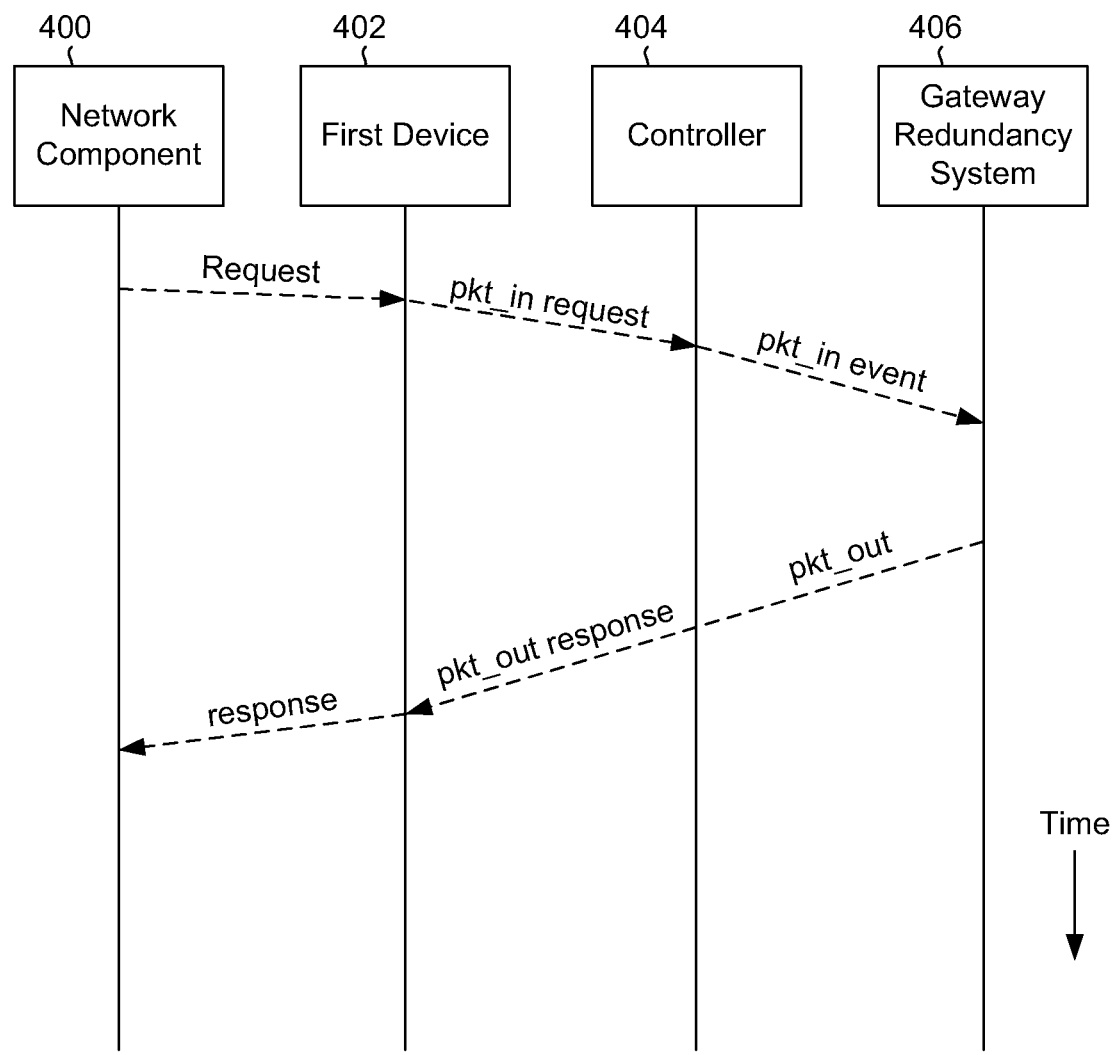
FIG. 4 is a diagram of an example of responding to a message from a network component according to the principles described herein.

FIG. 4 is a diagram of an example of responding to a message from a network component according to the principles described herein. In this example, an ARP request is sent to the gateway IP address from a network component (400) of the network through the first device (402), which is the master gateway, and the gateway redundancy system (404) responds. Such requests that come to the first device (402) are forwarded to the OpenFlow controller (406) as they constitute a new packet, as packet_in messages. The OpenFlow controller (406) hands off these messages to the gateway redundancy system (404) that then respond to the request with a response. This response is sent by the OpenFlow controller (406) to the first device (402) as a packet_out message. The first device (402) unwraps the packet_out message and sends out the encapsulated packet as a response to the appropriate network component.

Figure 5:
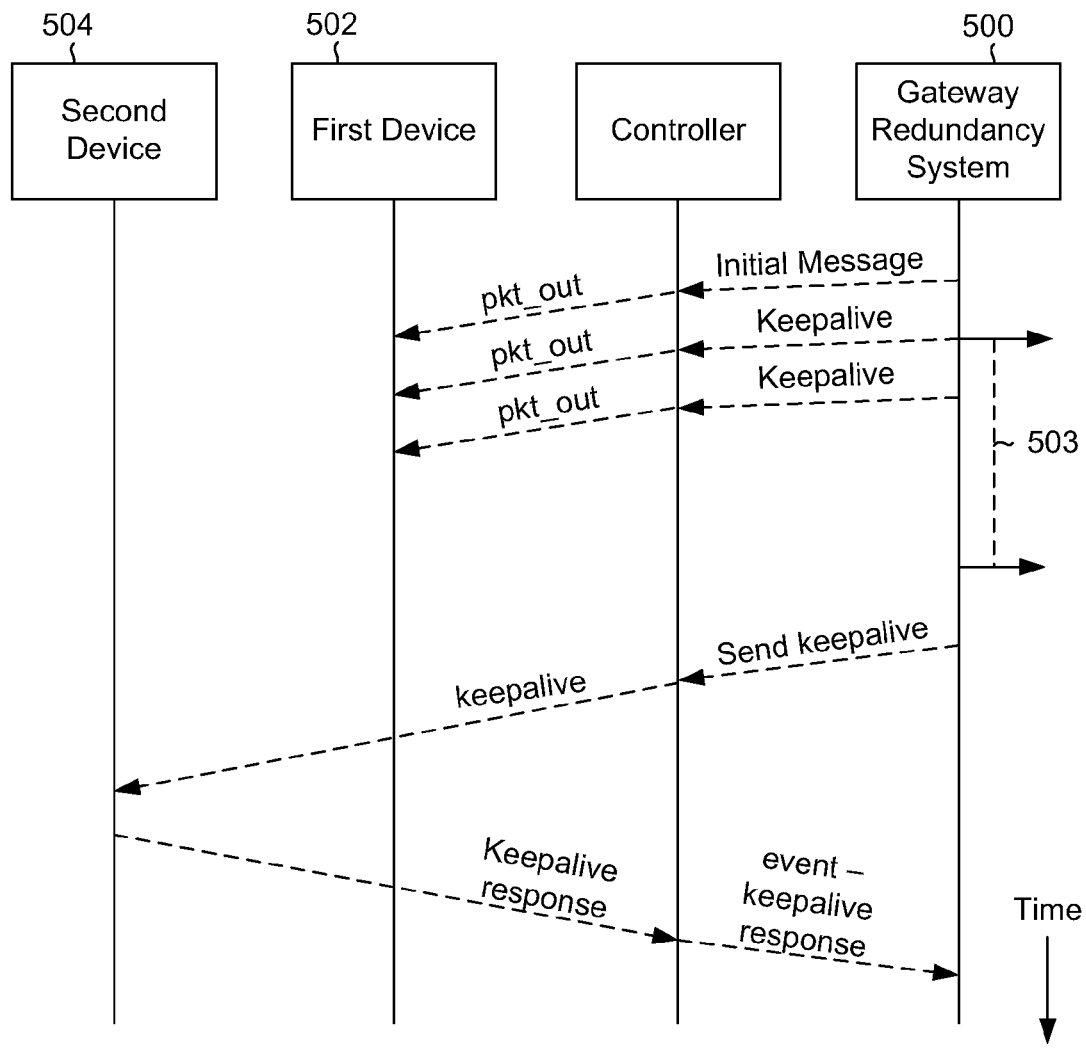
FIG. 5 is a diagram of an example of deciding to change the device that is designated as a master gateway according to the principles described herein.

FIG. 5 is a diagram of an example of deciding to change the device that is designated as a master gateway according to the principles described herein. In this example, the gateway redundancy system (500) sends messages and keepalives to the first device (502), which is initially classified as the master gateway. However, when the gateway redundancy system (500) does not receive back responses, such as packet_in events from the packet_out messages that should have been put onto the network with the first device, the gateway redundancy system (500) detects a failure. This failure is detected in response to waiting for more than a predetermined timeout period (503) for the response. The predetermined timeout period may be based on the value determined by a user in the gateway redundancy system (500). Such a predetermined timeout period may be for milliseconds, seconds, other time periods, or combinations thereof.

In response to detecting a failure, the connectivity of the second device (504) is verified by sending a keepalive message directly to the second device (504). If the second device (504) responds to the keepalive message, the gateway redundancy system (500) selects the second device (504) as the new master gateway. In some examples, in response to the second device (504) becoming the new master gateway, the sequence of operations involving the gateway redundancy system (500) will occur as described in connection with examples of FIGS. 3 and 4. While the example of FIG. 5 has been described with reference to a specific method for failure detection, any appropriate failure detection method may be used in accordance with the principles described herein.

Figure 6:
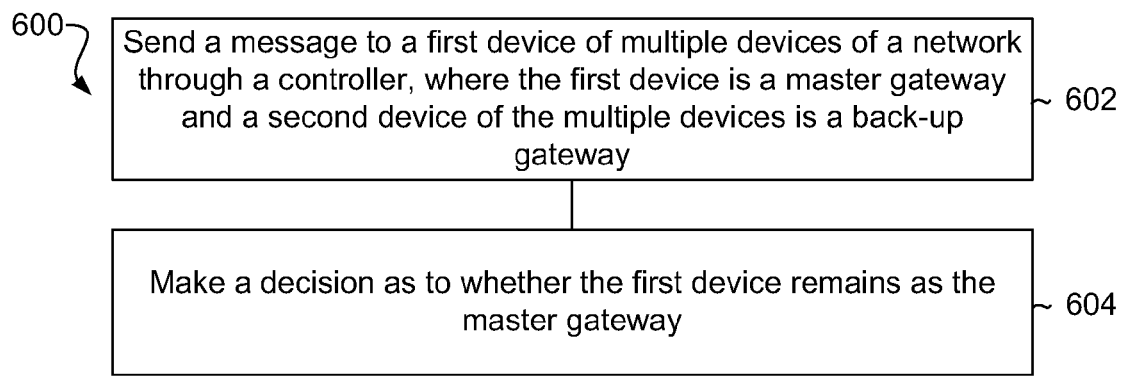
FIG. 6 is a diagram of an example of a method for implementing gateway redundancy in a network according to the principles described herein.

FIG. 6 is a diagram of an example of a method (600) for implementing gateway redundancy in a network according to the principles described herein. In this example, the method (600) includes sending (602) a message to a first device of multiple devices of a network through a controller where the first device is a master gateway and a second device of the multiple devices is a backup device and making (604) a decision as to whether the first device remains as the master gateway.

The decision about whether the first device should remain as the master gateway device may include determining whether an OpenFlow controller receives a response from the message. The message may be an address resolution protocol (ARP) request, a neighbor discovery (ND) request, another message, or combinations thereof. If no response is received within a predetermined timeout period, the gateway redundancy system may determine that the OpenFlow controller has not received the response. In other examples, other mechanisms and/or methods can be used to determine whether the first device should remain as the master gateway.

If a decision is made that the first device should no longer remain as the master gateway, the gateway redundancy system designates the second device as the master gateway. Such a designation causes the OpenFlow controller and other network components to recognize the second device as the master gateway. This may be accomplished by causing the second device to send out a gratuitous ARP request associating a virtual internet protocol (IP) address for the master gateway with a media access control (MAC) address of the second device to downstream network components. Without designating another device as the master gateway, the gateway redundancy system keeps the first device as the master gateway.

The gateway redundancy system may track and/or store information about the network's topology so that the gateway redundancy system can understand how to send messages to different network components of the network. In some examples, a message is sent to the second device by the gateway redundancy system, but it is first sent through the first device as the master gateway and forwarded to the second device.

In some example, the components of the networks send messages and/or requests to the gateway redundancy system through the master gateway. In response, the gateway redundancy system sends a response back to the network component through the master gateway. Such a request from the network components may include a request for information about another network component, such as the state of another network component, configurations of another network component, IP addresses of another network component, MAC addresses of another network component, priority of another network component, other information, or combinations thereof.

Figure 7:
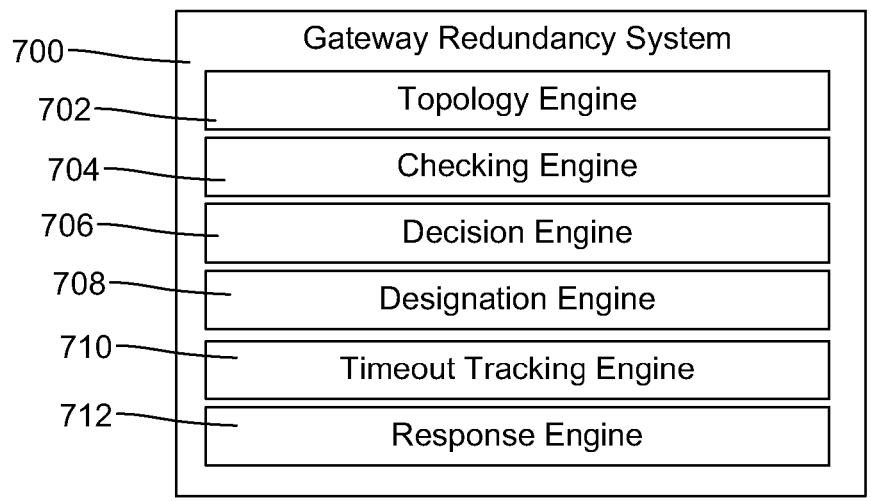
FIG. 7 is a diagram of an example of a gateway redundancy system according to the principles described herein.

FIG. 7 is a diagram of an example of a gateway redundancy system (700) according to the principles described herein. In this example, the gateway redundancy system (700) includes a topology engine (702), a checking engine (704), a decision engine (706), a designation engine (708), a timeout tracking engine (710), and a response engine (712). The engines (702, 704, 706, 708, 710, 712) refer to a combination of hardware and program instructions to perform a designated function. Each of the engines (702, 704, 706, 708, 710, 712) may include a processor and memory. The program instructions are stored in the memory and cause the processor to execute the designated function of the engine.

The topology engine (702) tracks and/or stores the topology of the network, which allows the gateway redundancy system (700) to know where to send messages in the network. The checking engine (704) checks to ensure that the device of the network designated to be the master gateway is performing its duties and/or is capable of performing its duties. The checking engine (704) may check the device by waiting for a response within a predetermined timeout period. In other examples, the checking engine (704) checks the device with a different method and/or mechanism.

The decision engine (706) makes a decision about whether the device designated as the master gateway should remain as the master gateway. The decision engine (706) may base its decision on the findings of the checking engine (704). The designation engine (708) designates a new device to be the master gateway in response to the decision engine (706) deciding that the previous device that was designated as the master gateway should no longer be the master gateway. The timeout tracking engine (710) tracks the predetermined timeout period that helps the decision engine (706) decide whether the device designated as the master gateway should remain as the master gateway. The response engine (712) responds to requests and/or messages sent from other network components through the master gateway.

Figure 8:
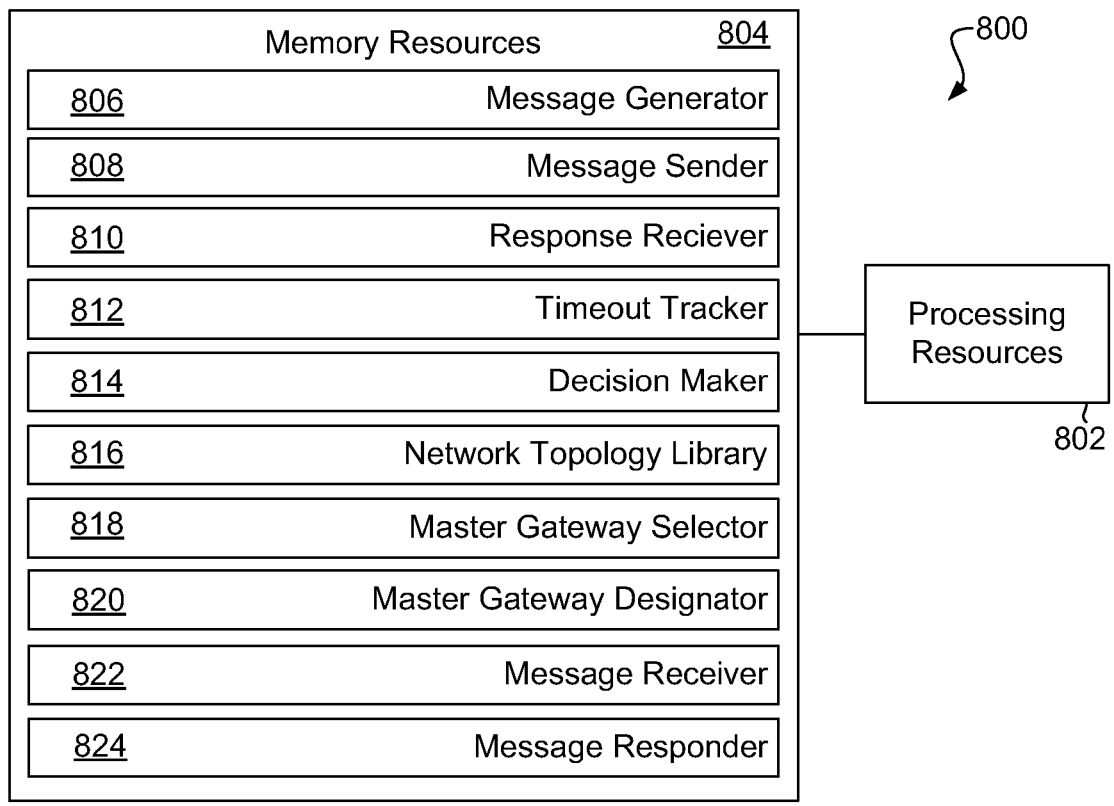
FIG. 8 is a diagram of an example of a gateway redundancy system according to the principles described herein.

FIG. 8 is a diagram of an example of a gateway redundancy system (800) according to the principles described herein. In this example, the gateway redundancy system (800) includes processing resources (802) that are in communication with memory resources (804). Processing resources (802) include at least one processor and other resources used to process programmed instructions. The memory resources (804) represent generally any memory capable of storing data such as programmed instructions or data structures used by the gateway redundancy system (800). The programmed instructions shown stored in the memory resources (804) include a message generator (806), a message sender (808), a response receiver (810), a timeout tracker (812), a decision maker (814), a master gateway selector (818), a master gateway designator (820), a message receiver (822), and a message responder (824). The data structures shown stored in the memory resources (804) include a network topology library (816).

The memory resources (804) include a computer readable storage medium that contains computer readable program code to cause tasks to be executed by the processing resources (802). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, or types of memory, or combinations thereof.

The message generator (806) represents programmed instructions that, when executed, cause the processing resources (802) to generate a message that can be sent to either the device designated as a master gateway or to another device in the network through the master gateway. The message sender (808) represents programmed instructions that, when executed, cause the processing resources (802) to send the message to the appropriate network device. The response receiver (810) represents programmed instructions that, when executed, cause the processing resources (802) to recognize the receipt of a response to the message sent to either the master gateway or through the master gateway.

The timeout tracker (812) represents programmed instructions that, when executed, cause the processing resources (802) to track the predetermined timeout period measured from when the message is originally sent from the gateway redundancy system (800). The decision maker (814) represents programmed instructions that, when executed, cause the processing resources (802) to decide if the device designated as the master gateway should remain as the master gateway. The decision may be based, at least in part, on whether a response to the message was received in either the OpenFlow controller or the gateway redundancy system (800) within the predetermined timeout period.

The master gateway selector (818) represents programmed instructions that, when executed, cause the processing resources (802) to select another device from the network topology library (816) to become the next master gateway in response to the decision maker (814) deciding that the current device designated as the master gateway should not remain as the master gateway. The master gateway designator (820) represents programmed instructions that, when executed, cause the processing resources (802) to designate a new device as the master gateway in response to the selection made by the master gateway selector (818).

The message receiver (822) represents programmed instructions that, when executed, cause the processing resources (802) to receive inbound requests or messages from network components. The message responder (824) represents programmed instructions that, when executed, cause the processing resources (802) to respond to such messages and/or requests as appropriate through the master gateway.

Further, the memory resources (804) may be part of an installation package. In response to installing the installation package, the programmed instructions of the memory resources (804) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (802) and the memory resources (804) are located within the same physical component, such as a server, or a network component. The memory resources (804) may be part of the physical component's main memory, caches, registers, non-volatile memory, or elsewhere in the physical component's memory hierarchy. Alternatively, the memory resources (804) may be in communication with the processing resources (802) over a network. Further, the data structures, such as the libraries and may be accessed from a remote location over a network connection while the programmed instructions are located locally. Thus, the gateway redundancy system (800) may be implemented on a user device, on a server, on a collection of servers, or combinations thereof.

The gateway redundancy system (800) of FIG. 8 may be part of a general purpose computer. However, in alternative examples, the gateway redundancy system (800) is part of an application specific integrated circuit.

Figure 9:
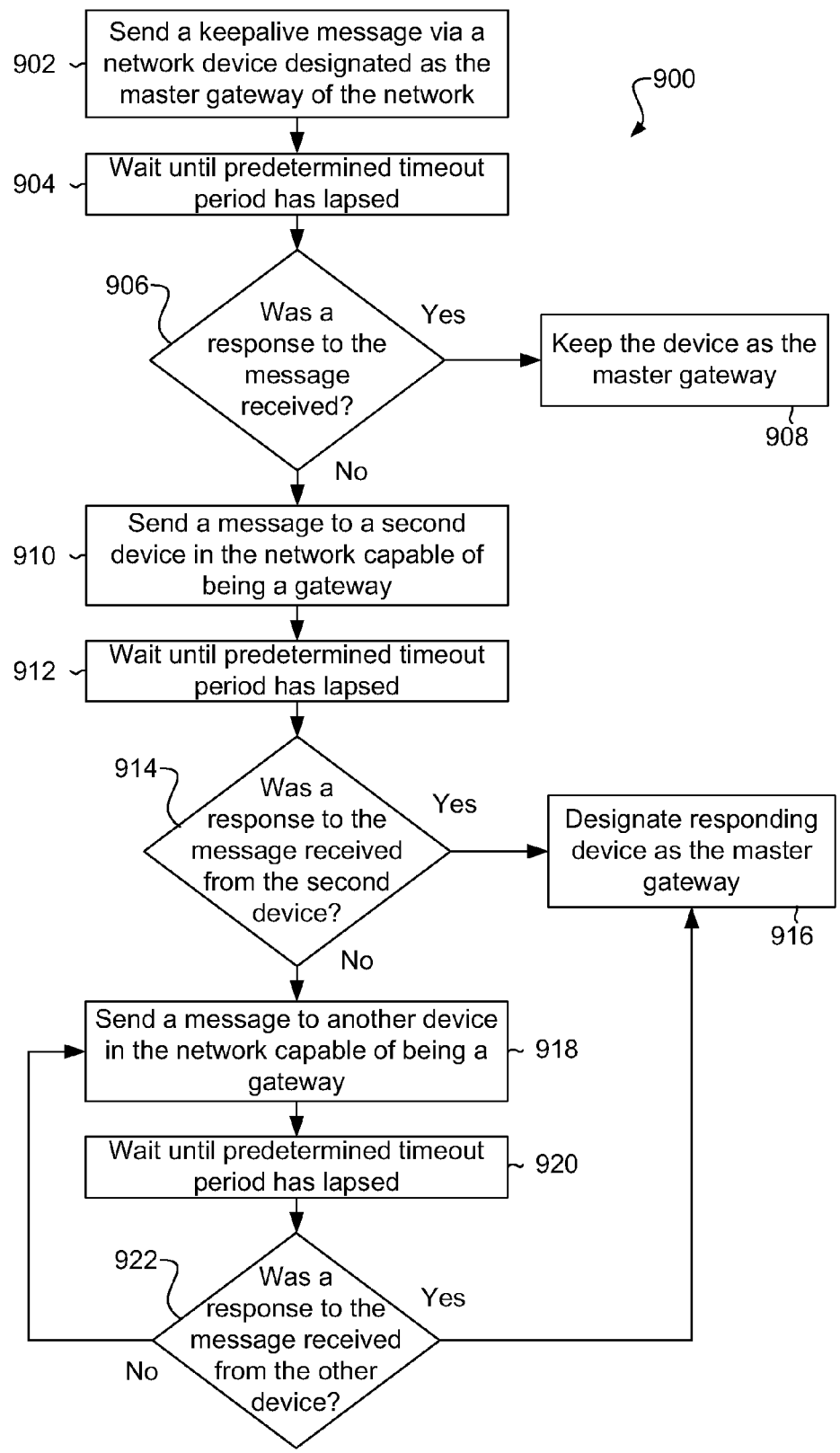
FIG. 9 is a diagram of an example of a flowchart of a process for implementing gateway redundancy in a network according to the principles described herein.

FIG. 9 is a diagram of an example of a flowchart (900) of a process for implementing gateway redundancy in a network according to the principles described herein. In this example, the process includes sending (902) a message to a device designated as a master gateway of a network and waiting (904) until a predetermined timeout period has lapsed. The process further includes determining (906) whether a response to the message was received. If so, the device designated as the master gateway is kept (908) as the master gateway.

On the other hand, if no response was received during the predetermined timeout period, the process will send (910) a message to a second device in the network that is capable of being a gateway and also wait (912) until the predetermined timeout period has lapsed. Again, the process includes determining (914) whether a response to this last message was received during the second predetermined timeout period. If a response was received during the predetermined timeout period, then the process includes designating (916) the responding device as the master gateway.

If a response from the latest message is not received during the second timeout period, then the process includes sending (918) yet another message to another device in the network that is capable of being a gateway and waiting (920) until the predetermined timeout period has lapsed. Accordingly, the process includes determining (922) whether a response was received within the predetermined timeout period. If no response was received, then another message is sent (918) to yet another device. If a response was received during the predetermined timeout period, the responding device is designated (916) as the master gateway.

While the examples above have been described with specific procedures for sending and receiving messages, any appropriate procedure for sending and/or receiving messages may be used in accordance with the principles described herein. Further, while the examples above have been described with reference to specific procedures for determining whether to keep a master gateway as the master gateway, any appropriate procedure for determining whether to keep a device as a designated gateway may be used in accordance with the principles described herein. Also, while the examples above have been described with reference to specific mechanisms for designating a different network device as the master gateway, any appropriate mechanism for designating a different network device as the master gateway may be used in accordance with the principles described herein.

While the examples above have been described with reference to specific arrangements between a gateway redundancy system and a network, any appropriate arrangement may be used in accordance with the principles described herein. Further, while the examples above have been described for IPv4 networks, the principles described herein may be applied to any appropriate network. For example, the principles described herein may also be used for IPv6 networks with minimal changes. The minimal changes include working with virtual IPv6 addresses and using the neighbor discovery (ND) requests and advertisements in place of ARP requests and responses.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for implementing gateway redundancy in a network, comprising:
sending a message to a first device of multiple devices of a network through a controller, where:
said first device is a master gateway; and
a second device of said multiple devices is a backup gateway;
determining whether said controller receives a response to said message, said response:
being responsive to said message; and
received from said first device; and
making a decision as to whether said first device remains as said master gateway based on whether a response to said message is received at said controller.

2. The method of claim 1, wherein determining whether said controller receives said response from said message includes determining whether a predetermined timeout period has lapsed since said message was sent.

3. The method of claim 1, wherein said message is an address resolution protocol (ARP) request, a neighbor discovery (ND) request, or combinations thereof.

4. The method of claim 1, further comprising designating said second device as said master gateway in response to said decision.

5. The method of claim 1, further comprising causing said second device to send out a gratuitous ARP request associating a virtual interact protocol (IP) address for said master gateway with a media access control (MAC) address of said second device to downstream network components.

6. The method of claim 1, further comprising keeping said first device as said master gateway in response to said decision.

7. The method of claim 1, wherein sending said message to said first device of multiple devices of said network through said controller includes sending said message to said second device through said first device.

8. The method of claim 1, further comprising receiving a second message from a network component through said master gateway.

9. The method of claim 8, further comprising sending a response to said network component through said master gateway.

10. The method of claim 1, wherein said response is generated by a device other than the first device.

11. The method of claim 4, wherein designating said second device as said master gateway comprises:
sending a message to said second device; and
receiving a response to said message.

12. A system for implementing gateway redundancy in a network, comprising:
a topology engine, comprising a processor and memory, to store a topology of said network;
a checking engine, comprising a processor and memory, to check, through a controller, that a first device designated as a master gateway to said network is capable of being said master gateway by receiving a response from the first device, said response being responsive to a message sent to the first device; and
a decision engine, comprising a processor and memory, to decide, through the controller, whether said first device will remain designated as said master gateway based on whether the checking engine received the response to the message sent to the first device,
wherein the system is distinct from the first device designated as the master gateway and a second device.

13. The system of claim 12, further comprising a designation engine to designate another device in said network as said master gateway.

14. The system of claim 12, further comprising a timeout tracking engine to determine whether a response from a message sent from said system has been received within a predetermined timeout period.

15. The system of claim 12, further comprising a responding engine to respond to messages from network components through said master gateway.

16. The system of claim 12, further comprising a configuration component to indicate a priority of a device for being the master gateway.

17. The system of claim 12, further comprising an action component to include actions that are taken based on information contained in a state component.

18. The system of claim 12, wherein said controller modifies forwarding behavior of both the first device and second device.

19. A computer program product for implementing gateway redundancy in a network, comprising:
a non-transitory computer readable storage medium, said non-transitory computer readable storage medium comprising computer readable program code et bodied therewith, said computer readable program code comprising program instructions that, when executed, causes a processor to:
store a topology of said network;
send a message to a first device and a second device of multiple devices of a network through a controller;
check that said first device designated as a master gateway to said network is capable of being said master gateway;
decide whether said first device will remain designated as said master gateway based on whether a response to said message is received at a controller from said first device within a predetermined timeout period; and
decide whether said second device is designated as said master gateway based on whether:
the response to said message is received at the controller from said first device within said predetermined timeout period; and
a response to said message is received at the controller from said second device;
designate said first device in said network as a backup gateway after said response from said second device is received at said controller.

20. The computer program product of claim 19, wherein the message is a keepalive message.

* * * * *